Feb. 1, 1938.　　　P. R. WHEELER　　　2,106,862
CONTROL SYSTEM FOR TRANSMISSIONS
Filed July 22, 1932　　　6 Sheets-Sheet 1
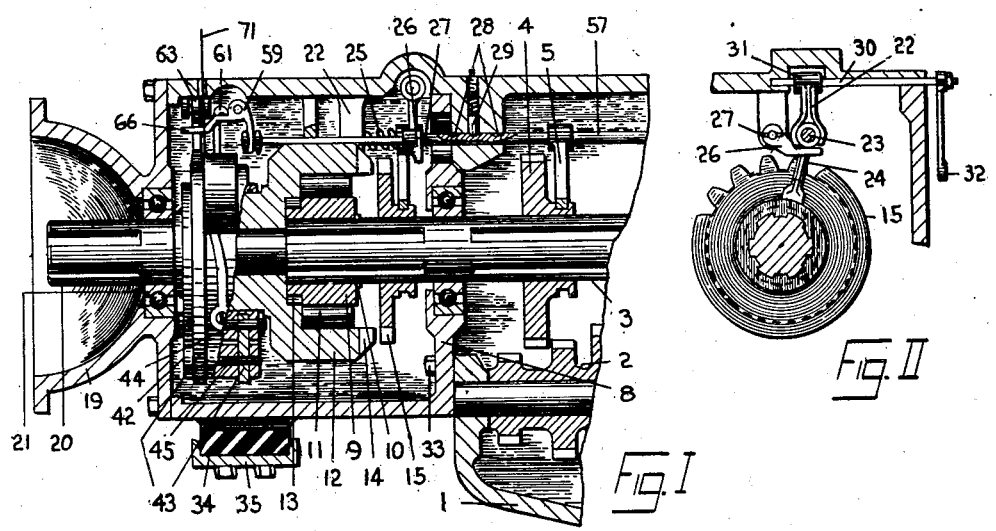
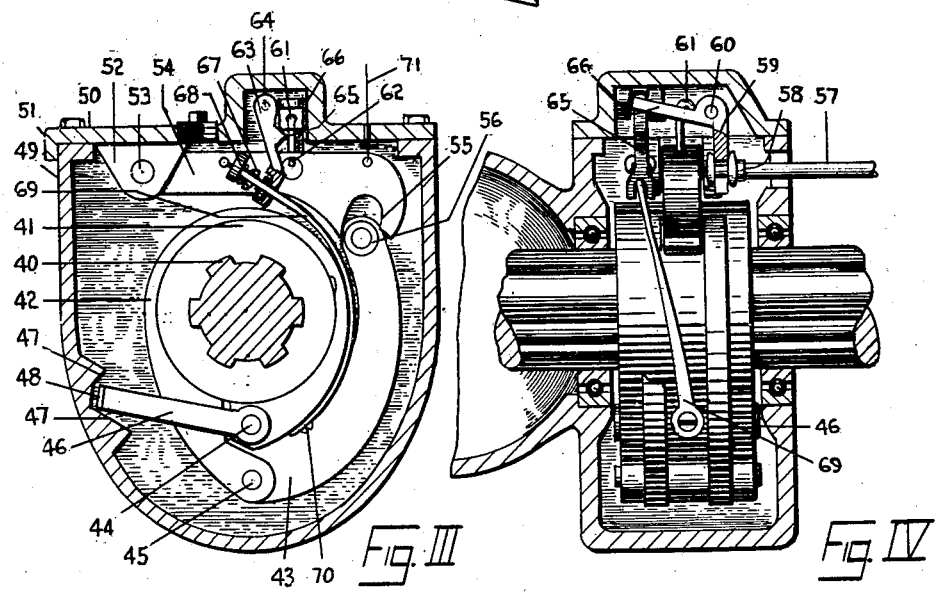
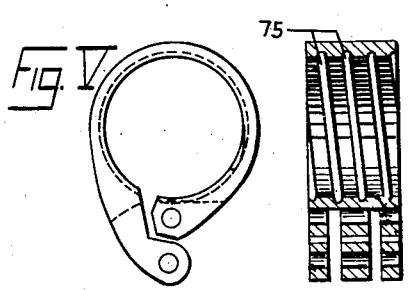
Inventor
Phillip R. Wheeler
By
Attorney

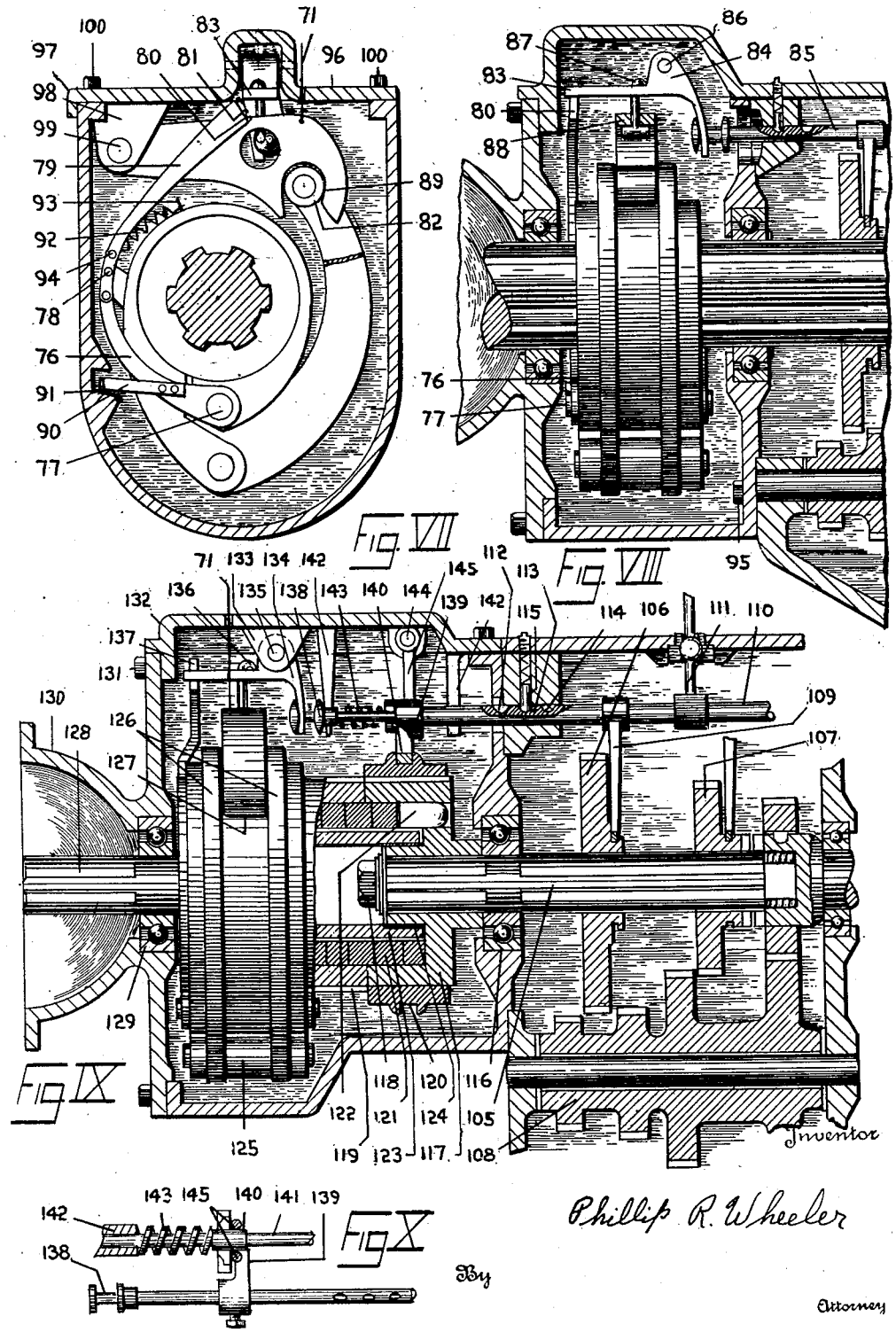

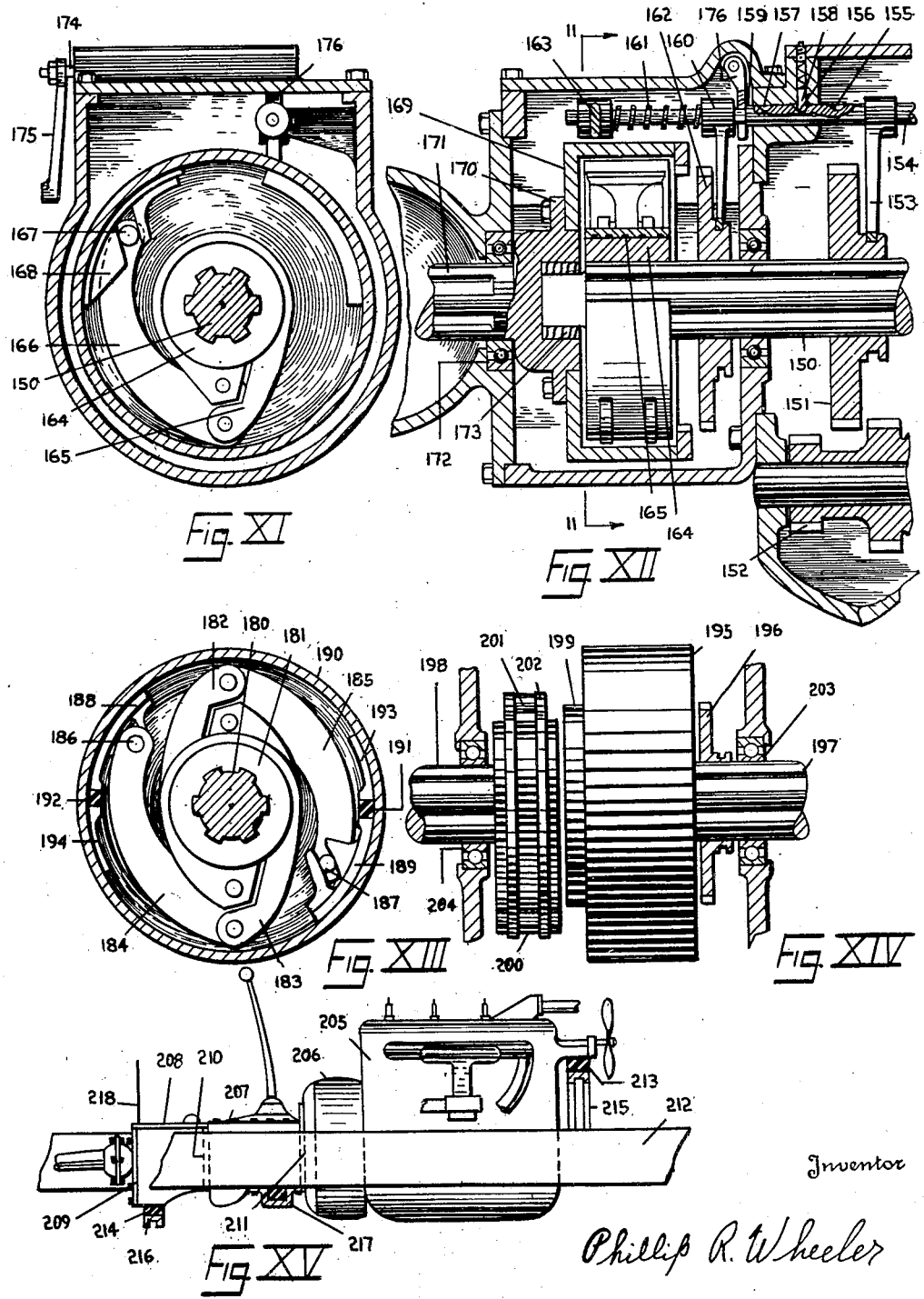

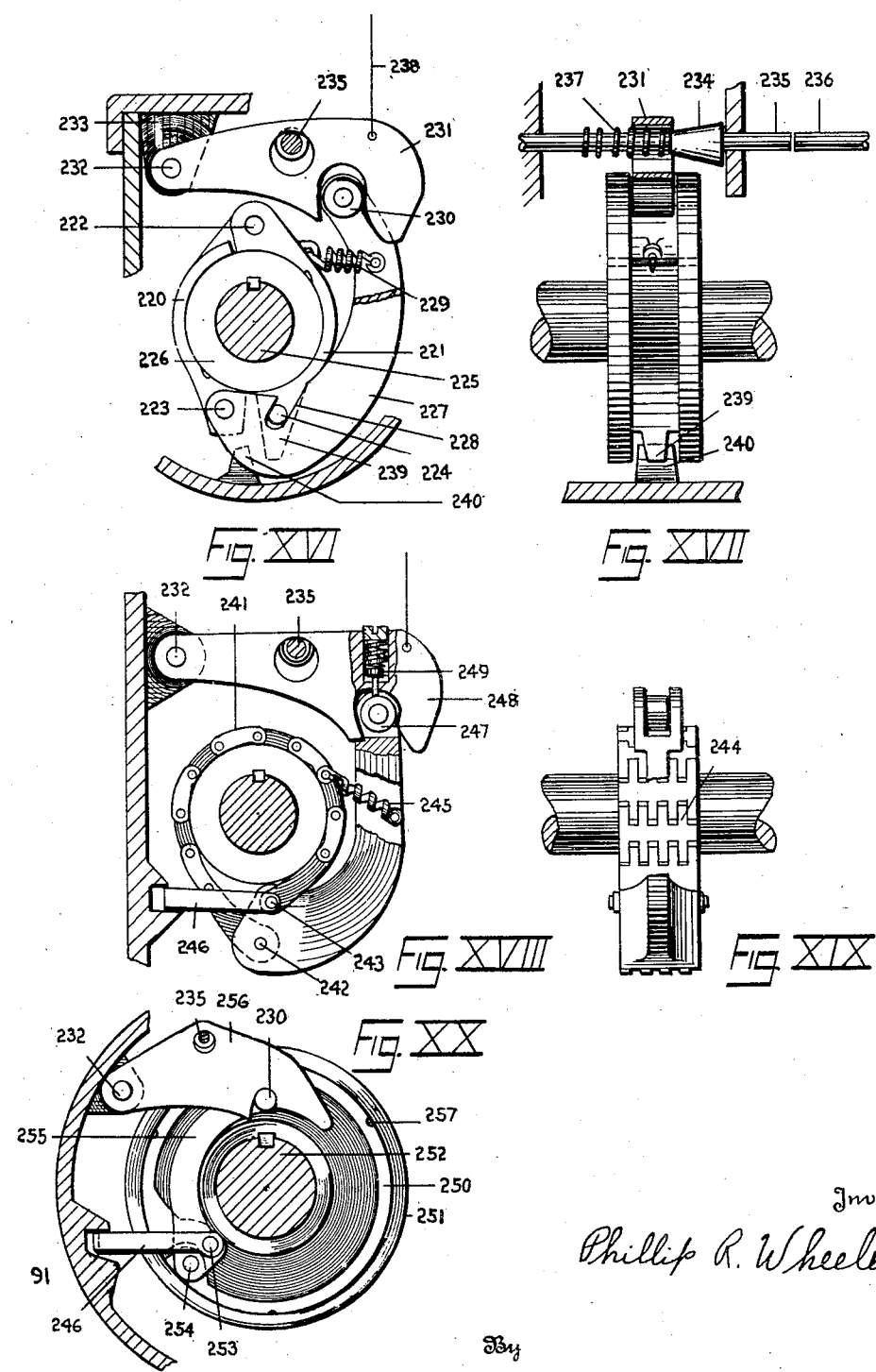

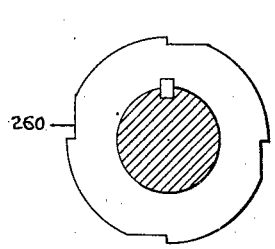
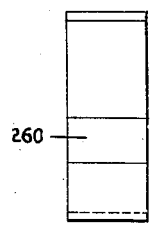
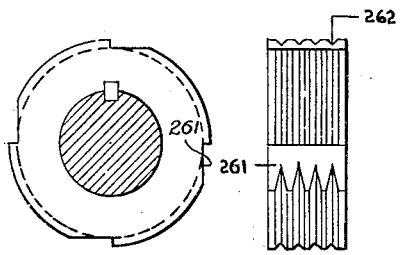
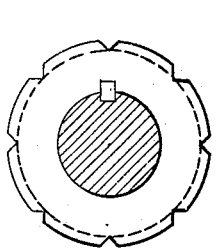
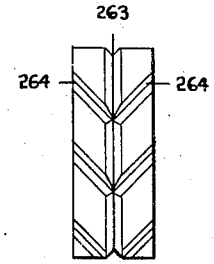
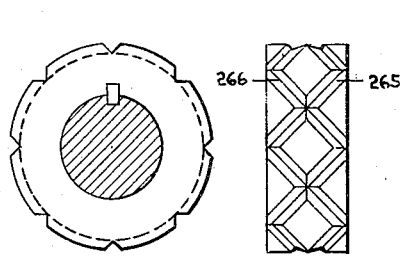
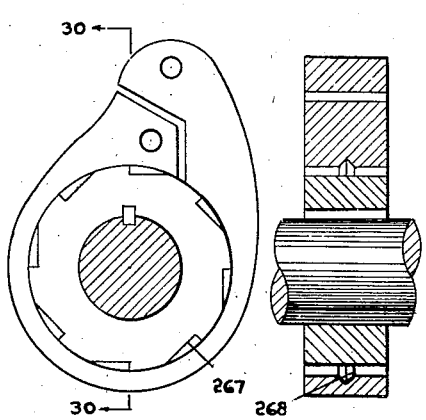
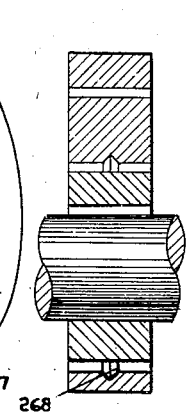
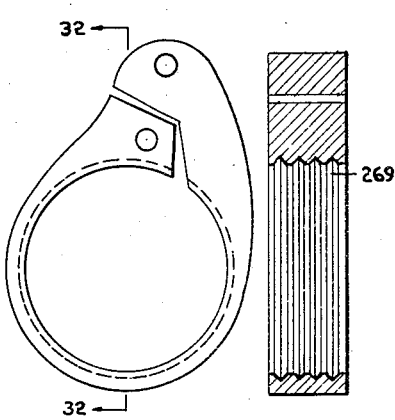
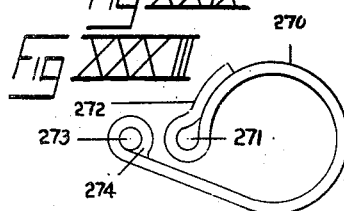
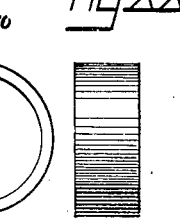

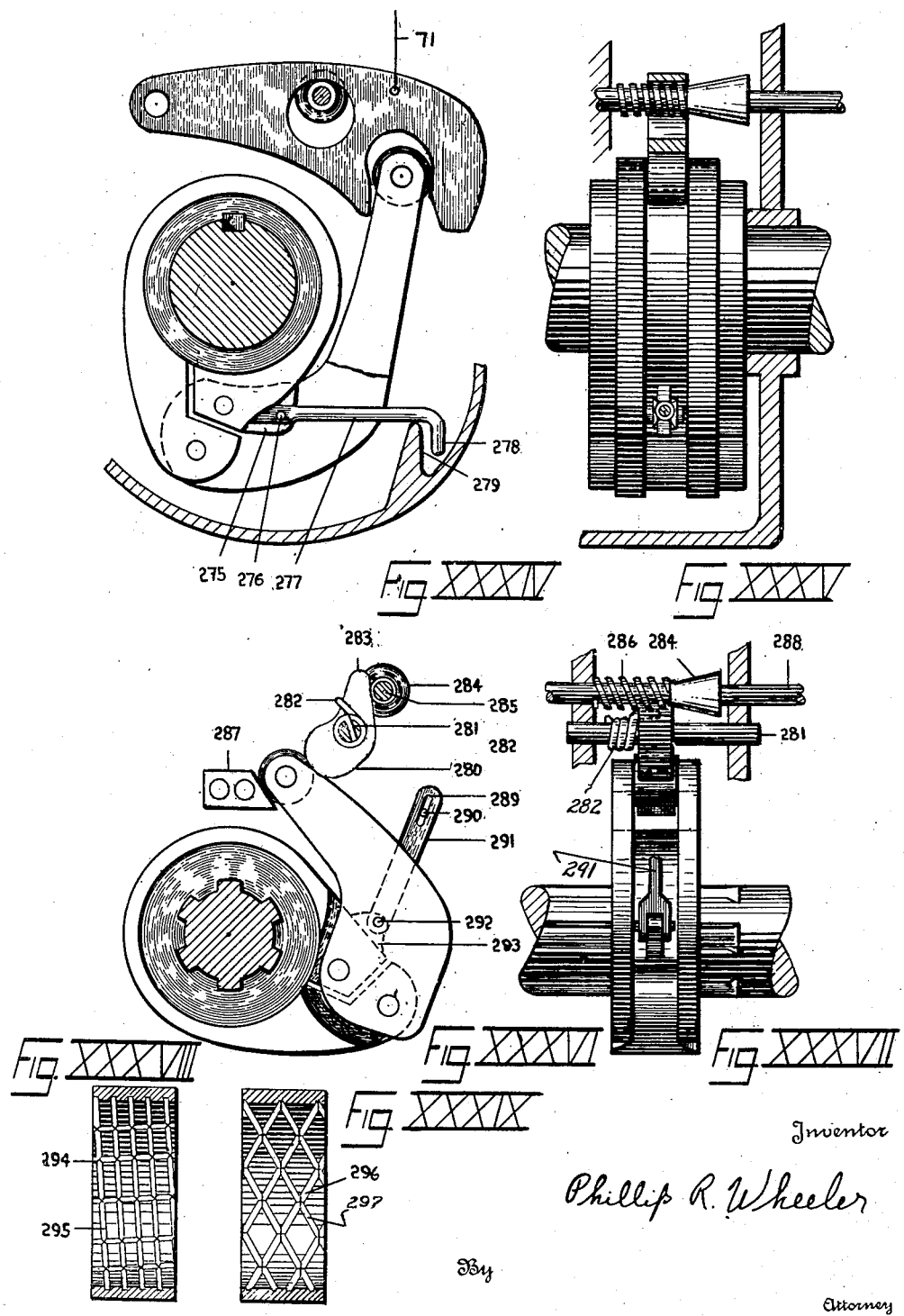

Patented Feb. 1, 1938

2,106,862

UNITED STATES PATENT OFFICE 2,106,862

CONTROL SYSTEM FOR TRANSMISSIONS

Phillip R. Wheeler, Alexandria, Va.

Application July 22, 1932, Serial No. 624,112

22 Claims. (Cl. 192—4)

The object of this invention is to provide no-back mechanisms and controls for them, which are readily adaptable to present transmissions and free-wheeling units.

A further object of this invention is to provide combination free-wheeling and no-back units.

A further object of this invention is to provide a combination of elements, including a no-back and a flexibly mounted engine, the flexible mounting of the engine serving as a shock absorber for the no-back in absorbing the shock due to the play or lost motion in the ring and pinion gears, the differential, and the universal joints.

A further object of this invention is to provide a simple free-wheeling unit.

Figure I is a side sectional view of a unit having the roller type of free-wheeling and the clamp ring type of no-back, the two devices being combined into a single unit, certain parts are removed or broken away for better illustration of others. The clamp-ring is more fully illustrated in Figures III and IV.

Figure II is a partial end view taken along line 2—2 of Figure I looking in the direction of the arrows showing the manner in which the free-wheeling lock-out operates.

Figure III is an end view of a no-back unit having control means for making the unit effective when shifting from neutral to low gear, after having been in reverse gear. The clamp-ring construction is the same as that shown in Figure I.

Figure IV is a side view of Figure III.

Figure V is an end view of a clamp ring as used in the no-back unit.

Figure VI is a sectional end view of Figure V, showing one form of grooving to relieve the oil film.

Figure VII is an end view of a no-back having a modified form of the control shown in Figures III and IV.

Figure VIII is a side view of Figure VII, showing the relation of the unit to a transmission.

Figure IX is a partially sectioned side view showing a transmission combined with spring type of free-wheeling and clamp ring type of no-back.

Figure X is a partial plan view of the control rods for the free-wheeling and no-back.

Figure XI is an end view of a clamp ring type of free-wheeling unit.

Figure XII is a partially sectioned side view of the free-wheeling unit of Figure XI mounted at the rear of a transmission.

Figure XIII shows an end view of a modified form of free-wheeling unit.

Figure XIV shows an external view of the free-wheeling unit of either Figures XI or XIII combined with a clamp ring no-back.

Figure XV shows diagrammatically a side view of an engine, clutch, transmission, and no-back unit, or no-back and free-wheeling unit, the whole assembly being solidly secured together and flexibly mounted on the frame, the flexible mounting serving as a shock absorber for the no-back.

Figure XVI is an end view of a modified form of clamp ring used as a no-back.

Figure XVII is a side view of Figure XVI.

Figure XVIII is an end view of still another modification of a clamp ring used as a no-back.

Figure XIX is a partial side view of Figure XVIII.

Figure XX is an end view of an internal type of clamp or clutch, for use as a no-back.

Figures XXI and XXII show a side and end view, respectively, of oil grooves to be used on the inner member of the clamp ring clutch.

Figures XXIII and XXIV show a side and end view, respectively, of another type of oil grooves for use with a clamp ring.

Figures XXV and XXVI show two views of still another form of oil grooves for use with a clamp ring.

Figures XXVII and XXVIII show two views of still another form of oil grooves for use with a clamp ring.

Figure XXIX is an end view of a collar and clamp ring.

Figure XXX is a sectional view of Figure XXIX.

Figure XXXI is an end view of a clamp ring.

Figure XXXII is a sectional view of Figure XXXI.

Figure XXXIII shows two views of another method of constructing a clamp ring.

Figure XXXIV is an end view of a clamp ring no-back having a modified form of holding means for the release.

Figure XXXV is a side view of Figure XXXIV.

Figure XXXVI is an end view of a clamp ring no-back having a modified stop means for the lever end.

Figure XXXVII is a side view of Figure XXXVI.

Figure XXXVIII is a sectional view showing the inside of a clamp ring having one form of oil grooves.

Figure XXXIX shows another form of oil grooves.

Referring to Figures I and II, a transmission housing is shown at 1, the counter-shaft gears at 2 and the transmission main shaft at 3. The low and reverse gear is shown at 4, this being controlled with a fork 5, which is secured to a shifter rod 57. The shifter rod is controlled in the usual manner, that is, by a shifting lever. The transmission may be of any conventional type.

The main shaft 3 is supported by the ball bearing 7, the bearing in turn being supported in the housing 8. Mounted on the end of the main shaft 3 is a cam 9 which is the inner member of a free-wheeling unit. The cam is held in place by a lock ring 10. Mounted on the cam are the rollers 11, and these are surrounded by the outer member of the free-wheeling unit 12. Between the two members of the free-wheeling unit is the alignment bearing 13. The front face of the outer member has teeth 14 which are engaged by the lock-out member 15, whenever a shift is made to reverse or whenever it is desired to lock out the free-wheeling unit with the manual control.

Mounted on an extension at the rear of the outer member is a clamp ring 42, having the lever arms 43 and the two pin connections 44 and 45. These parts are the same as those indicated by the same reference numerals in Figures III and IV. A portion of a universal housing is seen at 19 and the end of the outer free-wheeling member at 20, this being splined to receive one of the universal parts. The rear end of the shaft is supported by the ball bearing 21.

The control of the no-back is similar to that shown in Figures III and IV and will be described and explained in detail in connection with those figures. The control of the free-wheeling can be understood by referring to Figure II in connection with Figure I. The support 22 holds the rod 23 on which is mounted a fork 24 for moving the free-wheeling lock-out 15. This is normally held in the position shown by the spring 25 which is mounted on the rod 23. A finger 26 is slidably mounted on the shifting rod 6. A pin 27 in the rod 6 engages the finger and moves it to the left, moving with it the fork 24 and so locking out the free-wheeling when a shift is made to reverse. Three detents 28 for low, neutral and reverse, are engaged by a spring pressed plunger 29. A manual lock-out for the free-wheeling has a shaft 30 carrying the fork 31, which engages the fork 24 when moved by the manual connection 32.

The free-wheeling and no-back housing 8 is secured to the transmission housing 1 by means of cap screws 33. The bottom of the housing 8 has a flexible support in which rubber 34 is inserted between the cross support member 35 and the housing. This flexible support may be of any desired type.

Referring to Figures III and IV, a no-back similar to the one used in Figure I is shown. The transmission main shaft 40 has mounted on it a collar 41. Mounted on the collar is a clamp ring 42 having lever arms 43 connected to it by means of the pins 44 and 45. Secured to the pin 44 is a U-shaped member 46 which rests in the recess of the housing formed by the projections 47. A piece of leather or other shock absorbing material is secured to the end of the U, as at 48. The housing 49 has a cover 50. This cover 50 has a lug 51 to engage the outside of the housing 49.

Two ears 52 extend down from the top of the cover. Mounted to the ears by means of a pin 53 is a stop arm 54. The end of the stop arm has a surface 55 cut as a circle arc about the pin 53. The stop arm is shown in the released position but normally engages the roller 56 secured to the end of the lever arm.

The end of a transmission shifter rod 57 has mounted on it a member 58 which rests in the forked end of the bell crank 59, which is supported by the pin 60. The hook 61 engages the bell crank and passes through a hole in it and also through a hole in the stop arm 54 and is adapted to lift the stop arm off from the roller 56 when a shift is made to reverse. The knife edge 62 on the end of the hook engages the stop arm. A member 63 is pivotally supported by the pin 64. This has a cam 65, which is adapted to engage the end 66 of the bell crank 59. The end of the member 63 engages the spring 67 which in turn engages the end 68 of a connection 69, which is secured to the end of the clamp ring as at 70.

In operation the no-back is normally effective in all forward speeds and in neutral, but releases when a shift is made to reverse gear. Upon shifting from reverse to neutral, the no-back remains released. The no-back remains released on going from reverse to neutral because the bell crank arm 66 merely goes from the upward position shown in Fig. IV to a horizontal position. This just brings it into contact with the cam 65 but does not move the cam and the lever 63 to the left, as viewed in Fig. III, and so reset the clamp-ring. However, when shifting from neutral to low, it again becomes effective.

Referring to Figs. III and IV the operation is as follows: Normally the shaft 40 and collar 41 turn counterclockwise, this being forward motion. The shear of the oil film between the clamp ring 42 and collar 41 causes a tendency for the clamp ring to rotate with the collar. This motion or tendency to motion is transmitted by the lever arm 43 to the roller 56 which hits against the side to the left of the surface 55 of the stop arm 54. This holds the clamp ring from turning. Whatever force is exerted here also acts on the pins 44 and 45, this force tending to open the ring.

When the shaft stops and tends to turn in the reverse direction, the roller 56 hits against the surface 55 and the force now reacts on the pins 44 and 45 in the opposite direction, tending to tighten the ring on the collar 41. The ring 42 is similar to one turn of a coil clutch, that is, it has a cumulative wrapping action. This action is multiplied by the lever arm 43 so that the clamp ring is self locking, no backward motion of the collar or shaft being possible under normal operation.

When it is desired to back up or reverse the shaft, this may be done by shifting into reverse in the usual manner. This causes the rod 57 to move to the left, rotating the bell crank 59 about its pin 60 and lifting the hook 61 which has an end 62 engaging the stop arm 54. This causes the surface 55, which is a circle arc about the pin 53 which holds the stop arm, to be lifted or rotated off from the roller 56. Inasmuch as the stop arm 54 turns on the pin 53 and the surface 55 is a circle arc about the pin 53, the stop arm may be easily lifted even though the roller 56 is exerting a large force against the surface 55. This makes for easy release under all conditions.

As soon as the roller is released, the clamp ring and lever arm assembly turn backward with the shaft until the U-shaped member 46 hits against the housing at 48. This holds the inside end of the clamp ring which tends to open and release it, permitting the collar and shaft to rotate backward.

After having been in reverse, the no-back stays released until the clamp ring has rotated sufficiently to bring the roller 56 back under the stop arm at 55. If a shift is made to low gear, the rod 57 is moved to the right pulling down the end 66 of the bell crank 59. As the end 66 goes down it hits against the cam face 65 and rotates the member 63 to the left about the pin 64. This causes a pull on the end 68 of the wire or strap 69, this in turn pulling on the inner end of the clamp ring at 70. As this also tends to open and release the ring, being attached to the same end as the member 46, the pull on 69 turns the clamp ring and lever arm so that the roller 56 falls back under the stop arm end at 55. The spring 67 permits the bell crank 66 to ride over the cam 65 so that the clamp ring roller 56 can drop back against 55. Thus after having been in reverse a shift into low makes the no-back again effective without there necessarily being forward motion of the shaft and collar. If this feature is not desired the connection 69 and cam 63 may be omitted from the assembly.

A manual lock-out for the no-back is shown at 71 in Figure III, or at 72 in Figure I. This may be a wire or other connection running to the dash, or other convenient location.

The release of the clamp ring no-back is similar to that in my co-pending application filed March 17, 1932, Serial No. 599,515. The release is accomplished as above explained by letting go of the roller 56, permitting a backward movement so that the U member 46 hits against the housing at 48, thus holding the pin 44 and causing the clamp ring to open sufficiently to permit backward movement of the shaft.

In Figures V and VI, is shown one method of grooving the clamp ring to permit better circulation of oil, and to relieve the oil film when the shaft comes to a stop. A spiral groove 75 is cut in the engaging surface of the clamp ring.

Referring to Figures VII and VIII, a clamp ring no-back similar to the one shown in Figures V and VI is shown except that a different mechanism is used to cause the no-back to be effective when shifting from reverse to neutral and from neutral to low. The curved member 76 is secured to the pin 77 at one end. On the other end of the pin another member is fastened and this member, in turn, is attached to the first curved member as at 78, after passing around the back of the clamp ring.

The member 76 has the end 79 with the cam face 80. This face 80 takes the position shown by the dotted line at 81 when the roller 82 is released as by a shift into reverse. The cam face then rests under the end 83 of the bell crank 84. The bell crank and the shifter rod 85 are shown in the neutral position. When shifting to reverse, the shifter rod moves to the left, the bell crank pivoting at 86, pulling the hook 87 upward, and this in turn lifting the stop arm which is shown sectioned at 88. This permits the roller 82 to drop beneath the end 89 of the stop arm. The clamp ring then makes a backward movement and the member 90 comes in contact with the housing at 91, this opening the clamp ring sufficiently to permit backward movement of the shaft.

When shifting from reverse to neutral, the shifter rod and the bell crank return to the position shown, but the lever arm roller remains released from the stop arm as shown in Figure III. It is desirable that this should be so, as many drivers often shift from reverse to neutral before the car has come to a complete stop. If the car is still rolling backwards, and the no-back should suddenly be made effective, the wheels would be skidded or the car would be brought to a very sudden stop. It is usually necessary, however, to come to a stop before shifting into low, and it is then desirable that the no-back be effective.

In shifting to low, the shifter rod 85 moves to the right, causing the bell crank to pivot and move the end 83 downward. This engages the cam face 80, which is then in the position shown by the dotted line at 81. As the end of the bell crank moves downward, the cam face is moved from its position at 81 back to 80. This, through its connection with the pin 77, causes a rotational movement of the clamp ring so that the roller 82 again is engaged by the stop arm surface 89. A spring 92 is connected with the clamp ring at 93 and to the curved member 76 at 94. This serves to provide an initial tension on the clamp ring and to hold the member 76 in its proper position.

In Figure VIII a partial view of a transmission is shown and the manner in which the no-back housing may be mounted to the transmission housing. The two housings are secured together by cap screws, as at 95. The no-back housing has a cover 96. It has a lug 97 to take the main portion of the strain, while the no-back is holding. Two ears 98 are secured to the cover and the stop arm is secured to the ears by means of a pin 99. Cap screws 100 hold the cover in place. A manual lock-out may be provided, if desired, by securing a wire or other connection to the stop arm 127 as indicated at 71. The end of this connection is located on the dash, or any other convenient place. The lock out arrangement is the same as that shown in Figures I and III.

In Figure IX is shown a partial sectional view of a spring type of free-wheeling mechanism in combination with a clamp ring type of no-back. A partial view of a conventional transmission is also shown, indicating the relation of the free-wheeling and no-back to the transmission. The transmission has a main shaft 105. This has a sliding gear 106, for low and reverse, a second gear 107 and a counter shaft 108. A shifter fork 109 is secured to a shifter rod 110. The shifter rod is controlled by means of the shifting lever 111. Three recesses 112, 113 and 114 for low, neutral and reverse respectively, are engaged by a spring pressed plunger 115.

A bearing 116 supports the rear of the transmission main shaft. The end of the shaft is splined and has mounted on it a free-wheeling cup 117. This is held in place by means of a cap screw and washer as at 118. Butting against the cup 117 is a rear cup 119. Both cups are splined. The splined sleeve 120 is adapted to move to the left and lock the two cups together, when it is desired to lock out the free-wheeling. A coil member 121 is fitted inside the two cup members and has one end secured to the forward cup at 122. An alignment sleeve 123 is secured to the rear cup and has a bearing on the front cup at 124.

Mounted on the rear cup is a clamp ring 125, this having the levers 126. This clamp ring is similar to the one shown in Figs. VII—VIII. A roller in the end of the lever arm is engaged by a stop arm 127. The rear free-wheeling cup has a splined extension 128. This is supported by a bearing 129, the bearing being in turn supported by the housing member 130. This housing is held to the main housing by means of cap screws 131. The cover 132 has ears 133 which support a bell crank 134, this being pivoted on the pin 135. A hook arm 136 secured to the stop arm 127 extends through and engages the bell crank. A curved member 137 is similar to the member 76 in Figure VII.

A member 138 is mounted on the end of the shifter rod 110. The forked end of the bell crank 134 engages this member. Also secured to the shifter rod is a finger 139 (see Figure X). This finger is adapted to engage the shifter fork 140, which is slidably mounted on the rod 141, the rod 141 being secured to the projections 142 of the housing. A spring 143 serves to maintain the shifter fork in the position shown. A shaft 144 extends through the housing cover, somewhat as the shaft 30 in Figure II, and has a fork 145 secured to the inside end. This is adapted to serve as a manual lock-out control for the free-wheeling.

The operation and control of the no-back is similar to that shown in Figures VII and VIII. It is effective in all forward speeds and in neutral, except that, after shifting to reverse, it is not effective in neutral until a shift has been made to low. The free-wheeling is effective in all forward speeds and locks out when shifting to reverse, or may be maintained locked out at all times by means of the manual lock-out control. The no-back may be manually locked out if desired by means of the connection 71.

In Figures XI and XII, is shown a clamp ring type of free-wheeling unit, control for it, and its relation to a conventional transmission. A transmission main shaft is indicated at 150, a low and reverse gear at 151, and counter shaft gears at 152. A shifter fork 153 is secured to the shifter rod 154. This rod has the three recesses 155, 156, and 157, these being for reverse, neutral and low respectively. These are engaged by a spring pressed plunger 158. The shifter rod has a shoulder 159. The shifter fork 160 is slidably mounted on the rod and is engaged by the shoulder when the rod is moved to the left, this being the reverse gear position. The free-wheeling lock-out member is carried to the left by the shifter fork, this locking out the free-wheeling unit. The end of the shifter rod is slidably supported in the part 163.

Mounted on the end of the transmission main shaft, is the annular collar 164. This is surrounded by the clamp ring 165, having the lever arm 166. A pin 167, in the end of the lever arm, is engaged by the part 168. The part 168 is bolted or otherwise secured to the drum 169, this drum in turn being secured to the flange 170. This flange has the splined end 171 for connection to a universal or other power take-off. This end is supported in the housing by means of a bearing 172 and the flange end is supported on the end of the main shaft by means of the bearing 173. A counter weight 178 is secured to the inside of the drum 169 to offset the unbalance of the clamp ring and the lever arm.

A shaft 174 has a lever 175 for connection to a manual lock out control. This manual lock out control may be connected to any suitable manual control. The other end of the shaft 174 has a fork 176 secured to it, this fork being adapted to engage the shifter fork 160 when the manual lock out control is operated.

The operation of this free-wheeling unit is similar to those now commonly used, that is, it is effective in all forward speeds and automatically locks out when a shift is made to reverse. It becomes effective again upon shifting from reverse back to neutral. In Figure XI the shaft extending from the transmission normally rotates counter-clockwise. Torque is transmitted from the shaft to the collar 164, from this to the clamp ring, then to the drum by the connection at the end of the lever arm. When power is being supplied, all of the parts rotate together and at the same speed. If the rear wheels of the driven part tend to rotate faster than the part supplying the power, the clamp ring releases so that it has counter-clockwise rotation relative to the collar. At any time when the speed of the collar comes up to the speed of the clamp ring, the clamp ring again locks on it and the two rotate together.

The parts are shown with the collar being the driver and the clamp ring the driven part. In some cases it might be desirable to reverse this as the operation is satisfactory either way.

In Figure XIII is shown a modification of the free-wheeling unit of the two previous figures. Instead of using the single clamp ring and a counterbalance, two clamp rings are used. They are placed 180 degrees apart so that there is no unbalance. In case one clamp ring should lock slightly before the other, rubber equalizers are inserted so that the whole strain will not be imposed on one half of the unit.

A shaft is shown at 180, this having secured to it a collar 181. Mounted on the collar 180 degrees apart are two clamp rings 182 and 183. These have lever arms 184 and 185 and pins 186 and 187. These pins are engaged by members 188 and 189, these two members being slidably secured to the drum. Oil resisting rubber or other resilient material 191, 192 is inserted between the slidable members 188 and 189 and the two stationary members 193 and 194.

The control and arrangement of the parts in this free-wheeling unit may be similar to that of Figures XI and XII.

Figure XIV shows an external assembly view of the combination no-back and free-wheeling unit, both of the clamp ring type. The drum 195 encloses either of the types of free-wheeling units just described. The lock out member 196 may be controlled in any of the manners described. The shaft 197 drives a collar which connects to the shaft 198 by means of the clamp ring or rings within the drum and the drum itself which is secured to the flange 199. The no-back clamp ring 200 has the roller 201 secured to the end of the lever arms 202. This roller may be releasably engaged in any of the manners previously shown. Bearing support is provided for each of the shafts at 203 and 204.

In Figure XV is shown diagrammatically an assembled power plant, with clutch, transmission and no-back or no-back and free-wheeling. An engine 205 is secured to a clutch housing 206; the transmission 207 is secured to the clutch, and the no-back or the no-back and free-wheeling is secured to the transmission. These parts are fastened together with bolts, cap screws or other means as at 209, 210 and 211. This complete assembly is flexibly mounted to the frame 212 at the points 213 and 214. These points have rubber or other resilient material supported on channels or other parts 215 and 216 which are secured to the frame.

At 217 one end of a leaf spring is embedded in a block of rubber or other resilient material, the other end being attached to a part of the housing. This serves as a damper, preventing undue rotational movement of the assembled unit. A wire for the no-back manual lock out is shown at 218.

The object of securing the no-back holding members to a housing and then securing the housing parts to a flexibly mounted engine is to provide a shock absorber for the no-back parts so as to relieve them of undue strain. There is normally no lost motion or backward movement between the no-back parts themselves, but it is well known that ring and pinion or other rear drive gears must be fitted with a certain amount of clearance in order to insure proper lubrication and life. Differential gears also have a certain amount of lost motion, as do also most universal joints. This combined lost motion is sufficient to permit a car to acquire some backward momentum which causes a strain on the driving parts, and the no-back parts and is more or less unpleasant for driver and passengers when the car is brought to a sudden stop, as all of the play or lost motion is taken up.

In Figure XVI is shown a modification of a clamp ring which may be used for any of the purposes which have been shown. The ring is made up of two segments 220 and 221, these being connected by means of the pin 222. The other ends of the ring segments have the pins 223 and 224 respectively which are secured in them and project on either side. The two pins instead of being on or nearly on a diameter of the shaft 225 and collar 226 are both on or nearly on a radius or circle arc about the center of the shaft.

The lever arms 227 are pivotally connected to the pin 223, but have a cam connection 228 with the pin 224. The ring and the lever arm have the spring 229 attached between them as shown to provide a slight initial tension on the clamp ring. The ends of the lever arms carry a roller 230, this being releasably engaged by the stop arm 231. The pin 232 secures the stop arm to a portion of the housing 233. A cone shaped cam 234 is secured to a rod 235, the end of this rod being in line with the end of a low and reverse shifter rod 236. A spring 237 serves to return the cam to the position shown when a shift is made from reverse to neutral. A connection for a manual lock-out control is shown at 238. A projection 239 on the right side of the clamp ring, is adapted to engage a portion of the housing 240 when the roller on the end of the lever arms is released by the stop arm. This causes the ring to open and permit backward movement of the shaft.

In Figures XVIII and XIX is shown still another modification of a clamp ring applied to a no-back. This like the other may be used for any of the purposes which have been shown for clamp ring clutches. The clamp ring here is made up of pivoted segments 241. Two end segments connect to a lever arm by means of the pins 242 and 243. The ends of the segments are slotted as seen in Figure XIX, at 244, this permitting the use of smaller pins as it gives more shear sections. A spring 245 produces an initial tension on the ring. A U-shaped member 246 connects to the pin 243 and causes the clamp ring to open slightly when the roller 247 is released by the stop arm 248. A spring pressed plunger 249 serves to maintain the roller against the stop arm. The control of the stop arm is similar to that previously described. This type of clamp ring would normally be used under extreme service conditions, where a large amount of wear occurred, which could not be readily taken up with the solid type of ring.

In Figure XX, is shown still another modification of the clamp ring principle. Here an internal band 250 is used inside the drum 251. The drum is secured to the shaft 252. Two pin connections 253 and 254 connect the ends of the band to the lever 255. The end of this lever is releasably engaged by the stop arm 256, this stop arm being controlled in any of the manners previously described. The drum moves freely in the counter-clockwise direction, but locks against the internal band when it tends to rotate clockwise. The engaging surface of the band is provided with oil grooves, as seen at 257. The stop arm 256 corresponds to the stop arm 231 of Figure XVI and 248 of Figure XVIII. One end of this lever is pivoted to the housing at 232 and the other has a surface which engages the roller 230 at the end of the lever 255. The shaft 235 corresponding to the same shaft indicated in Figures XVI, XVII and XVIII passes through an opening in the lever 256 to disengage the stop surface from the roller 230. The stop member 246 corresponding to the stop member 246 shown in Figure XVIII is pivotally attached to the pin 253 to engage the recess 91 formed in the housing.

When the operator desires to release the clamp ring, the shaft 235 with its cam 234 (not shown in Figure XX) disengages the hook and after slight movement of the clamp-ring 250 in the clockwise direction, the member 246 engages with the housing at 91, holding the clamp-ring and releasing it for reverse rotation of the shaft 252.

If the device is mounted in such a position that the weight of the lever 256 would tend to unhook it from the pin 230, any suitable well known means such as a spring or weight may be provided for yieldably moving the stop arm 256 into engagement with the roller, which is secured to the end of the lever 255.

It will be understood that where reference is made to the manual movement of the shaft or rod 235, that this movement may be accomplished in the course of ordinary gear shifting without the necessity for any special action on the part of the operator.

The next group of figures shows various methods of grooving either the inner or the outer member, or both members of the clamp ring type of clutch. Where clutches are used dry, no grooving is required, but when run in oil the size and number of the grooves necessary for satisfactory operation is proportional to the viscosity of the oil used and indirectly proportional to the amount of initial tension on the ring. The grooves serve the purpose of circulating oil, and of relieving the oil film so that the two members may lock together when relative motion between them tends to be in the locking direction.

In Figures XXI and XXII, is shown an internal member, this having the step cuts 260, these cuts being of such size and number as any particular design may require.

In Figures XXIII and XXIV is shown an internal member with step cuts 261 together with annular grooves 262.

In Figures XXV and XXVI is shown an internal member having an annular groove 263 and side grooves 264.

In Figures XXVII and XXVIII is shown an internal member having cross spiral grooves 265 and 266.

In Figures XXIX and XXX is shown an internal member having step cuts 267 and an external member having a central annular groove 268.

In Figures XXXI and XXXII is shown an external member having annular grooves 269.

In Figure XXXIII is shown another method of construction for a clamp ring. It is made up by forming a piece of flat stock, having the body 270, the pin connection 271, this being secured by welding or otherwise fastening the end 272. The pin connection 273 is formed by butt welding as at 274. Construction of this kind may be used where light strong units are required, this being adaptable to use high strength steels. Grooving may be milled in before forming, if desired. The other construction, using castings, while slightly heavier is cheaper and generally satisfactory.

In Figures XXXIV and XXXV the construction is very similar to that previously shown except that the clamp ring has an ear 275, this ear having connected to it by means of the pin 276, a hook 277 having the end 278. This end engages a part 279 when the end of the lever arm is released. The control and operation of this is the same as has previously been described.

In Figures XXXVI and XXXVII a no-back with a modified form of stop for the lever end is shown. This has the member 280 pivoted on the pin 281 and is normally maintained in the position shown by means of the spring 282. The end 283 is engaged by a cone shaped cam 284 whenever a shift is made to reverse. This cam is mounted on the rod 285, which is in line with the end of a low and reverse shifter rod 288. The spring 286 serves to return the cam when shifting from reverse to neutral. A stop 287 is provided to prevent rotation of the clamp ring. A slot 289 of the rod 291 engages the pin 290 which is secured to a part of the housing. This has the pin connection 292 to the ear 293, which is part of the clamp ring end.

The end of the member 280, which engages the lever arm roller is a circle arc about the pin 281. As the member 280 is rotated counter clockwise by the cam 284, the relieved portion of 280 permits a backward movement of the roller, this taking up the slack in the slot 289 so that the end of the rod is held by the pin 290. This spreads the clamp ring and permits backward movement. When the end of the lever arm has been released in the manner just described it will be reset after withdrawal of the cam 284 by the first forward movement (anti-clockwise) of the shaft it being noted that the spring 282 tends to turn the stop member 280 in a clockwise direction thereby increasing the friction between the clamp-ring and the shaft and also assisting the anti-clockwise movement of the lever arm.

As long as the circle arc surface of the stop member 280 engages the lever arm roller there is no force tending to rotate the stop member. As soon as the stop member has been rotated by cam 284 so that the roller contacts the relieved portion on the upper side of the circle arc surface, then the roller and clamp ring are permitted to rotate with the shaft until the slack in slot 289 is taken up on pin 290. During this movement, however, the roller stays on the upper side of the circle arc surface of the stop member 280. When the drive shaft, clamp ring and lever are rotated in the forward direction (counter clockwise) the spring 282 returns the stop member 280 to the position shown, where the circle arc surface again contacts the roller.

Figures XXXVIII and XXXIX are sections of clamp rings as on F—F of Figure XXXVI. These show two forms of oil grooves. Figure XXXVIII has the annular spiral grooves 295 and the axial grooves 294. The other figure shows spiral grooves 296 in one direction and spiral grooves 297 in the other direction.

I claim:

1. In a no-back device, a portion of a driving shaft, a circular clamp ring fitting around the said shaft, a lever having two lines of connection with the said clamp ring near one end of said lever, means releasably engaging the end of the lever, means operably associated with a transmission having forward and reverse speeds to cause the release of the said lever end when a shift is made to reverse, and a means operable to cause the lever end to be re-engaged when a shift is made to low.

2. In a no-back device, a portion of a driving shaft, a clamp ring encircling the said shaft, oil grooving cut in the engaging surface of the clamp ring, a lever arm attached to the clamp ring, a pivoted stop arm engaging a roller secured to the end of the said lever arm, means operable to cause the stop arm to release the roller, means operable after the release of the roller for holding the clamp ring against rotation and means operably associated with the clamp ring to cause the roller to be re-engaged by the stop arm.

3. In a no-back device, a one-way brake having a circular inner member and an annular outer member, the annular outer member having two ends for connection to a lever, a lever connected to the outer member, means releasably engaging the end of the lever, means when the end of the lever has been released to hold one end of the outer member, and means connected to the held end of the outer member to cause the lever end to be re-engaged.

4. In a no-back device, a one way brake having a circular inner member and an annular outer member, the annular outer member having two ends for connection to a lever, a lever arm secured to these two ends, grooving in the inner surface of the outer member, means releasably engaging the end of the said lever arm, means when the end of the lever has been released to hold one end of the outer member, and means connected to the held end of the outer member to cause the lever end to be re-engaged.

5. In a driving shaft, a break in the shaft, a plurality of clamp rings on one side of the break, lever arms for the clamp rings, the said clamp rings and lever arms being mounted so as to render the rotating assembly statically and dynamically balanced, connections from the opposite side of the said break to the end of the lever arms, torque being transmitted from one side of the said break in the shaft through the clamp rings and lever arms to the opposite side.

6. Claim 5 and other means operable to transmit torque from one side of the said break in the shaft to the other side.

7. In a driving shaft, a break in the shaft, clamp rings mounted on one side of the break, lever arms for the clamp rings, connection from the ends of the lever arms to the other side of the said break, resilient means inserted in the connection between the shaft and the said lever ends, the said resilient means permitting a better distribution of the torque load between the clamp rings.

8. In a self locking one way mechanism, a rotary shaft having a cylindrical surface, a clamp ring mounted on said shaft and having a bearing surface closely fitting and releasably engaging the cylindrical surface of the shaft, the said clamp-ring being split in a direction substantially parallel to the axis of the shaft and being yieldably held in engagement therewith, a lever arm pivoted to the ring at two points, one on each side of the split therein, the said ring having one integral piece from one pivot point around the shaft to the other pivot point, and oil grooves closely spaced in the inner surface of said clamp ring to permit escape of oil from between the bearing surfaces.

9. In a device of the class described, a rotary shaft having a cylindrical surface, a clamp ring mounted on said shaft and having a bearing surface closely fitting and releasably engaging the cylindrical surface of the shaft, said clamp ring being split in a direction substantially parallel to the axis of the shaft and being yieldably held in engagement therewith, a lever arm pivoted to the ring at two points, one on each side of the split therein, the said ring being integral from one pivot point around the shaft to the other pivot point, and oil grooves closely spaced in the inner surface of the said clamp ring to permit the escape of oil from between the bearing surfaces, said grooves being substantially helical in form whereby the relative rotation of the shaft and clamp ring will tend to cause a flow of oil therethrough.

10. In a device for permitting relatively free rotary motion in one direction, a shaft having a cylindrical engaging surface, a clamp ring mounted on the said shaft and having an engaging surface closely fitting and yieldably held against the cylindrical surface of the shaft, the clamp ring having a cut through it, a lever arm secured to the said ring on each side of the cut, the said lever arm being adapted to apply a tensil load to the ring structure and the ring structure having an integral piece to resist the said tensil load, lock grooving cut in the engaging surface between the clamp ring and shaft, the said clamp ring and lever arm being adapted to permit free relative motion of the shaft in one direction and to positively lock and prevent relative movement in the other direction.

11. In a device of the class described, a rotatable member having a cylindrical engaging surface, a normally stationary member which has a cylindrical engaging surface fitting closely with the cylindrical surface of the first member, the said second member having two ends, a lever arm, connections between the two ends of the said second member and one end of the lever arm, a stop member, the said stop member being adapted to releasably engage one end of the lever arm, a housing to form a protective cover over the said mechanism, and to form an oil reservoir, and lock grooving cut in the engaging surface between the said rotatable member and clamp ring, the said grooving breaking the engaging surface area so that no part is substantially spaced from a groove.

12. In a self locking one-way mechanism, a ring having a cylindrical engaging surface, a shaft member having a surface fitting closely with the cylindrical surface of the ring, means forming a lever arm for the ring, two lines of connection between the ring and lever arm, the said ring being of a single structural piece, means causing an initial pressure between the ring and shaft member, lock grooving cut in the surface of the ring so that no part of the engaging surface has substantial width, means for holding the lever arm so as to permit free motion of the shaft member in one direction and to positively lock and hold the shaft member against relative motion in the other direction.

13. In a no-back device for automotive use, a shaft member, a ring fitting closely with the shaft member and having two ends, a lever arm, connection between the lever arm and the two ends of said ring, a roller secured to the end of the lever arm, a stop member, the stop member being adapted to hold the roller on the lever arm, a housing surrounding the said device, connection between the stop member and the housing, means associated with a transmission control for causing the stop member to release the roller, a stop for holding the ring against reverse rotation after the release of the roller and for releasing the ring to permit reverse rotation of the shaft member, cam and bell crank means associated with the transmission control for causing the stop member to reengage the roller and grooving in the engaging surface of the said ring.

14. In a no-back device, a shaft member, a ring fitting closely with the shaft member and having two ends, a lever arm, connection between the lever arm and the two ends of said ring, a stop member, the stop member being adapted to hold the lever end, means associated with a transmission control for causing the stop member to release the lever end when the said means is moved in one direction and for causing the stop member to reengage the lever end when the said means is moved in the other direction.

15. A mechanism as set forth in claim 14 and the said ring having closely spaced grooving in its engaging surface.

16. In a no-back device, a shaft member, a self-locking one-way mechanism mounted on the shaft member, a roller secured to a part of the self-locking one-way mechanism, a stop member for engaging the roller, means operably associated with a transmission control for causing the stop member to release the roller when the said means is moved in one direction and for causing the stop member to reengage the roller when the said means is moved in the other direction, the said self-locking one-way mechanism being constructed and arranged to permit reverse rotation of the shaft member after the release of the roller and to prevent reverse rotation of the shaft member after the roller has been reengaged.

17. In a no-back device, a one-way brake having a rotated part and a normally stationary part, a stop member for engaging and holding the stationary part, a roller acting between the stop member and the engaged part of the said brake and means for causing the stop member to release the said roller and brake part, and other means then acting to permit reverse rotation of the rotated part, and the said means operable to cause the stop member to release the brake part being also operable to cause the stop arm to reengage the brake part.

18. In a mechanism for permitting free relative rotary motion in one direction of one rotating part with respect to another, and for preventing relative rotary motion in the opposite direction, a ring having a cut therethrough, a lever connected to the ring on each side of the cut, a rotatable part mounted to engage with the ring and fitting closely with it, the ring being resiliently held in engagement with the said rotatable part, a second rotatable member mounted close to the said ring and lever, the second rotatable member having resilient connection to the lever arm, the said second member being adapted to apply pressure to lock the ring and first rotatable member together when the second member is rotated in one direction or to release the first member if the first member rotates faster than the second member.

19. A structure as stated in claim 18 and closely spaced grooving cut in the surface of the ring.

20. In combination, a transmission having forward and reverse speeds, a shifting lever for selecting the desired speed, a one way brake of the clamp-ring type associated with the transmission, the clamp-ring of the said one way brake having a lever arm, means for normally preventing rotation of the clamp ring, the said means engaging the said lever arm, means operably connected with the transmission shifting lever for releasing the one way brake when a shift is made to reverse, the said release means being constructed and arranged to release under load without any relative movement of the parts in a direction to displace the load, means for maintaining the brake released when the transmission is shifted to neutral, and means operable when the transmission is shifted to low gear to render the one way brake operative.

21. In a back stop device for use with automotive transmissions having forward and reverse speeds, a clamp-ring with a lever arm, means for holding the end of the lever arm to prevent reverse rotation of the clamp ring, means associated with the reverse speed shifting mechanism to cause the release of the said lever end, means associated with the forward speed shifting mechanism to cause the lever end to be reengaged, the said means causing no forward pressure on the lever end when the forward speed gear is fully engaged.

22. A device as set forth in claim 18 and other means associated with the said device operable to connect the two said rotatable parts together so as to transmit torque in either direction of rotation.

PHILLIP R. WHEELER.